(12) United States Patent
Peterson et al.

(10) Patent No.: US 7,726,251 B1
(45) Date of Patent: Jun. 1, 2010

(54) AGRICULTURAL SEEDING APPARATUS AND METHOD FOR SEED PLACEMENT SYNCHRONIZATION BETWEEN MULTIPLE ROWS

(75) Inventors: James R. Peterson, Annawan, IL (US); Nathan A. Mariman, Geneseo, IL (US); Carl S. Silbernagel, Moline, IL (US); Samuel Santiago, Colona, IL (US); Jason D. Walter, Davenport, IA (US); Ron G. Landman, Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/401,682

(22) Filed: Mar. 11, 2009

(51) Int. Cl.
*A01C 7/00* (2006.01)
*A01C 9/00* (2006.01)
*G06F 7/70* (2006.01)
*G06F 19/00* (2006.01)
*G06G 7/00* (2006.01)

(52) U.S. Cl. .................. 111/185; 111/900; 111/904; 111/922; 701/50

(58) Field of Classification Search ......... 111/130–133, 111/11–14, 170–188, 200, 900, 903, 904, 111/921, 922; 701/50
See application file for complete search history.

(56) References Cited

U.S. PATENT DOCUMENTS

| | | | | |
|---|---|---|---|---|
| 5,260,875 A | * | 11/1993 | Tofte et al. ................... 701/50 |
| 5,323,721 A | * | 6/1994 | Tofte et al. .................. 111/200 |
| 5,407,134 A | * | 4/1995 | Thompson et al. .......... 239/156 |
| 5,621,666 A | * | 4/1997 | O'Neall et al. .............. 700/283 |
| 5,685,245 A | * | 11/1997 | Bassett ........................ 111/62 |
| 5,709,271 A | * | 1/1998 | Bassett ........................ 172/4 |
| 5,740,746 A | * | 4/1998 | Ledermann et al. ......... 111/174 |
| 5,837,997 A | * | 11/1998 | Beck et al. ............. 250/227.11 |
| 5,915,313 A | * | 6/1999 | Bender et al. ............... 111/178 |
| 5,924,371 A | * | 7/1999 | Flamme et al. .............. 111/177 |
| 5,956,255 A | * | 9/1999 | Flamme ..................... 700/244 |
| 6,003,455 A | * | 12/1999 | Flamme et al. .............. 111/200 |
| 6,009,354 A | * | 12/1999 | Flamme et al. .............. 700/184 |
| 6,024,035 A | * | 2/2000 | Flamme ...................... 111/178 |
| 6,039,141 A | * | 3/2000 | Denny ........................ 180/329 |
| 6,070,538 A | * | 6/2000 | Flamme et al. .............. 111/170 |
| 6,070,539 A | * | 6/2000 | Flamme et al. .............. 111/177 |
| 6,079,340 A | * | 6/2000 | Flamme et al. .............. 111/178 |
| 6,091,997 A | * | 7/2000 | Flamme et al. ............... 700/83 |
| 6,145,455 A | * | 11/2000 | Gust et al. .................. 111/178 |
| 7,273,016 B2 | | 9/2007 | Landphair et al. |
| 7,377,221 B1 | | 5/2008 | Brockmeier |

(Continued)

*Primary Examiner*—Christopher J. Novosad

(57) ABSTRACT

A seeding machine having a plurality of row units and a processing circuit. Each of the row units have a seed metering device, a seed placement device and a sensor suitable to detect a parameter related to seed placement. The seed metering device includes a metering member providing a metering action to a plurality of seeds. The seed placement device receives the seeds from the seed metering device. A seed meter drive controller receives an index signal from the sensor on the row unit as well as a reference pulse signal. The processing signal of the drive controllers compares the index signal to the reference signal. Each drive controller is selectively programmable to control an associated motor of the meter drive to produce a desired relationship between the row unit index signal and the reference signal thereby synchronizing the seed placement among two or more rows. block diagram illustrating an alternative arrangement of the meter drive and control system components.

26 Claims, 7 Drawing Sheets

U.S. PATENT DOCUMENTS

| | | | |
|---|---|---|---|
| 7,478,603 B2* | 1/2009 | Riewerts et al. | 111/200 |
| 2002/0170476 A1* | 11/2002 | Bogner et al. | 111/183 |
| 2004/0088330 A1* | 5/2004 | Pickett et al. | 707/104.1 |
| 2004/0206282 A1* | 10/2004 | Sandoval et al. | 111/52 |
| 2004/0231575 A1* | 11/2004 | Wilkerson et al. | 111/127 |
| 2005/0098216 A1* | 5/2005 | Bodie | 137/540 |
| 2005/0103244 A1* | 5/2005 | Mayerle et al. | 111/175 |
| 2005/0150160 A1* | 7/2005 | Norgaard et al. | 47/58.1 SE |
| 2007/0048434 A1* | 3/2007 | Mayerle et al. | 427/8 |
| 2008/0202398 A1* | 8/2008 | Wilkerson et al. | 111/118 |
| 2009/0090284 A1* | 4/2009 | Peterson et al. | 111/185 |
| 2009/0139436 A1* | 6/2009 | Memory | 111/130 |

\* cited by examiner

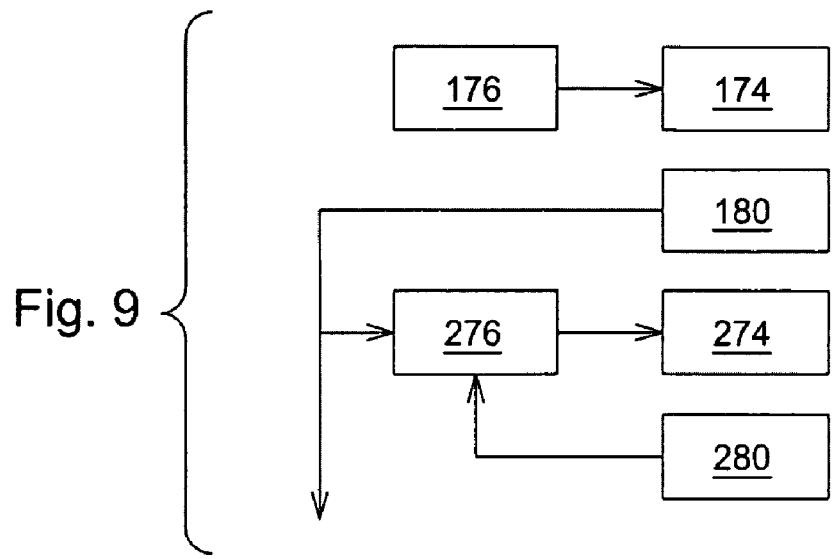
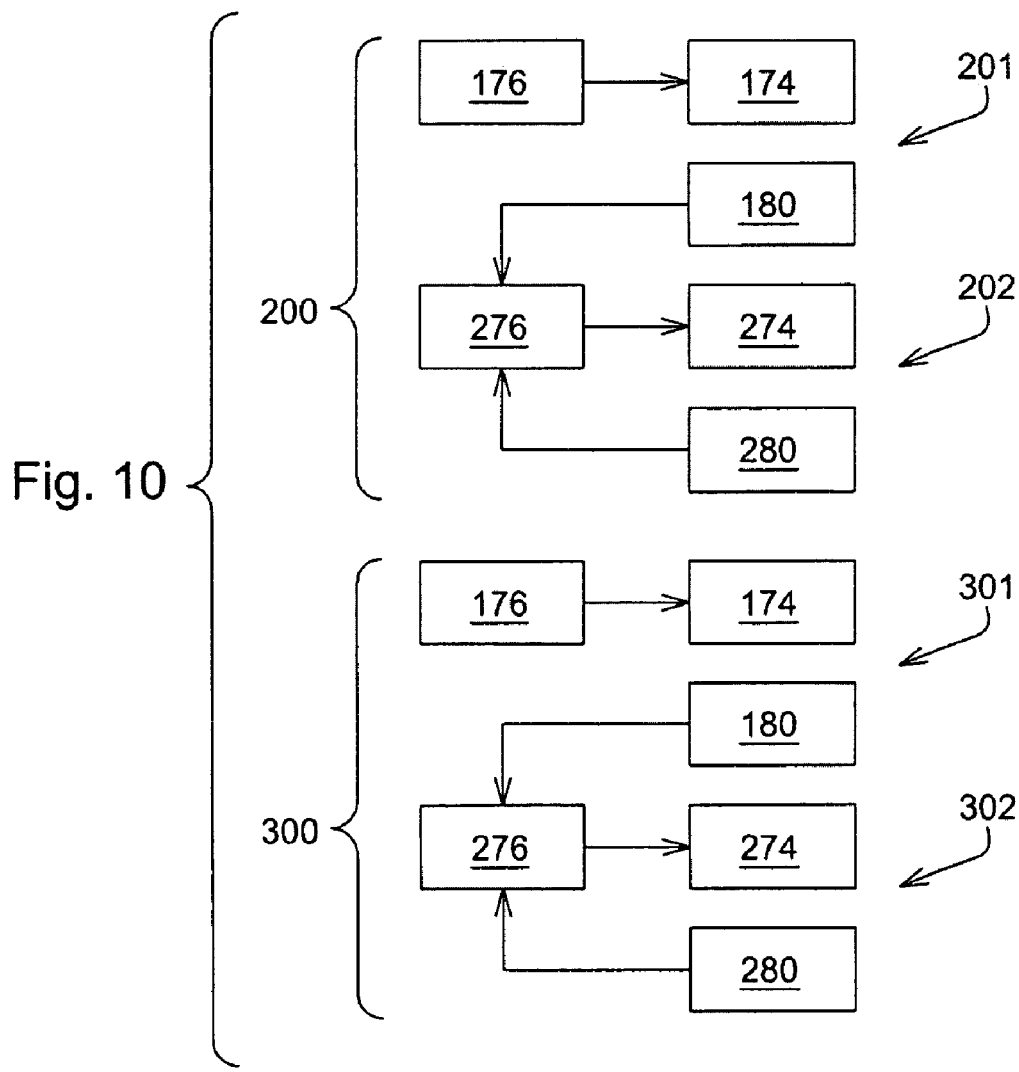

AGRICULTURAL SEEDING APPARATUS AND METHOD FOR SEED PLACEMENT SYNCHRONIZATION BETWEEN MULTIPLE ROWS

FIELD OF THE INVENTION

The present invention relates to agricultural seeding machines, and, more particularly, to the synchronization of seed placement among two or more plant rows.

BACKGROUND OF THE INVENTION

An agricultural seeding machine, such as a row crop planter or grain drill, places the seed at a desired depth within a plurality of parallel seed furrows formed in soil. In the case of a row crop planter, a plurality of row units are typically ground driven using wheels, shafts, sprockets, transfer cases, chains and the like. Each row unit has a frame, which is movably coupled with a tool bar. The frame may carry a main seed hopper, herbicide hopper and insecticide hopper. If the granular herbicide and insecticide are used, the metering mechanisms associated therewith for the dispensing of the granular product into the seed furrow are relatively simple. On the other hand, mechanisms necessary to properly meter seeds at a predetermined rate and to place the seeds at a predetermined relative location and depth within the seed furrow are relatively complicated.

The mechanisms associated with metering and placing of the seeds generally can be divided into a seed metering system and a seed placement system, which are in communication with each other. The seed metering system receives the seeds in a bulk manner from a seed hopper carried by the frame. Different types of seed metering systems can be used such as seed plates, finger plates, seed disks and belts. In the case of a seed disk metering system, a seed disk is formed with a plurality of seed cells spaced about the periphery thereof. Seeds are moved into the seed cells with one or more seeds in each seed cell depending upon the size and configuration of the seed cell. A vacuum or positive pressure airflow may be used in conjunction with the seed disk to assist in movement and retention of the seeds in the seed cells. The seeds are singulated and discharged sequentially at a predetermined rate to the seed placement system.

The seed placement system may be categorized as a gravity drop system or a power drop system. In the case of a gravity drop system, a seed tube has an inlet end, which is positioned below the seed metering system. The singulated seeds from the seed metering system merely drop into the seed tube and fall by way of gravitational force from a discharge end thereof into the seed furrow. The seed tube may be curved in a rearward manner to assist in directing the seed into the seed furrow A seed placement system of the power drop variety generally can be classified as a seed conveyor belt drop, rotary valve drop, chain drop or air drop. These types of seed placement systems provide somewhat consistent placement of the seeds along a predetermined path at a desired spacing.

Planting of certain crops, such as corn, in what is called "twin-rows" is becoming increasingly popular. With twin-rows, two rows are closely spaced, for example, spaced apart 7.5 inches (19 cm). The centers of the twin rows are spaced 30 inches (76 cm) apart from the next set of twin rows. Within the twin rows, to maximize the yield, it is necessary to alternate the seeds in the twin rows to avoid crowding of the plants. What is needed in the art is an agricultural seeding machine having an automated system to synchronize or to assist the operator in synchronizing the seed placement between rows of seeds.

SUMMARY OF THE INVENTION

The invention includes a seeding machine having a plurality of row units and a processing circuit. Each of the row units have a seed metering device, a seed placement device and at least one sensor. The seed metering device includes a seed metering member or device such as a seed disk, plate, belt or finger plate providing a metering action to a plurality of seeds. The seed placement device receives the seeds sequentially from the seed metering device and delivers the seed to a seed furrow formed beneath the row unit. The sensor detects a parameter related to seed placement. The sensor may be a seed sensor positioned to detect the passage of seeds through the metering device, the seed placement device or in the furrow beneath the row unit. The sensor may also detect a feature of the metering member or the meter drive that relates to the seed placement. The processing circuit receives an index signal from each of the row unit sensors. In addition, the processing circuit receives a reference signal with periodic pulses. The processing circuit compares the index signals from the sensors of each row with the reference signal and determines a current relationship therebetween. For each row unit, there is a desired relationship between the reference signal and the index signal. If the actual relationship does not meet a desired relationship, the metering action of the row unit is altered to establish the desired relationship. Among the two row units in twin-row planting, the relationship between one row unit index signal and the reference signal will differ from the relationship between the other row unit index signal and the reference signal to produce the alternating, i.e. staggered, pattern of plants among the two twin rows. Any other desired pattern between multiple rows can be produced beyond the above twin-row example.

BRIEF DESCRIPTION OF THE DRAWINGS

FIG. 9 is block diagram illustrating an alternative arrangement of the meter drive and control system components; and FIG. 10 is a block diagram illustrating another alternative arrangement of the meter drive and control system components.

DETAILED DESCRIPTION OF THE INVENTION

Figure 1:
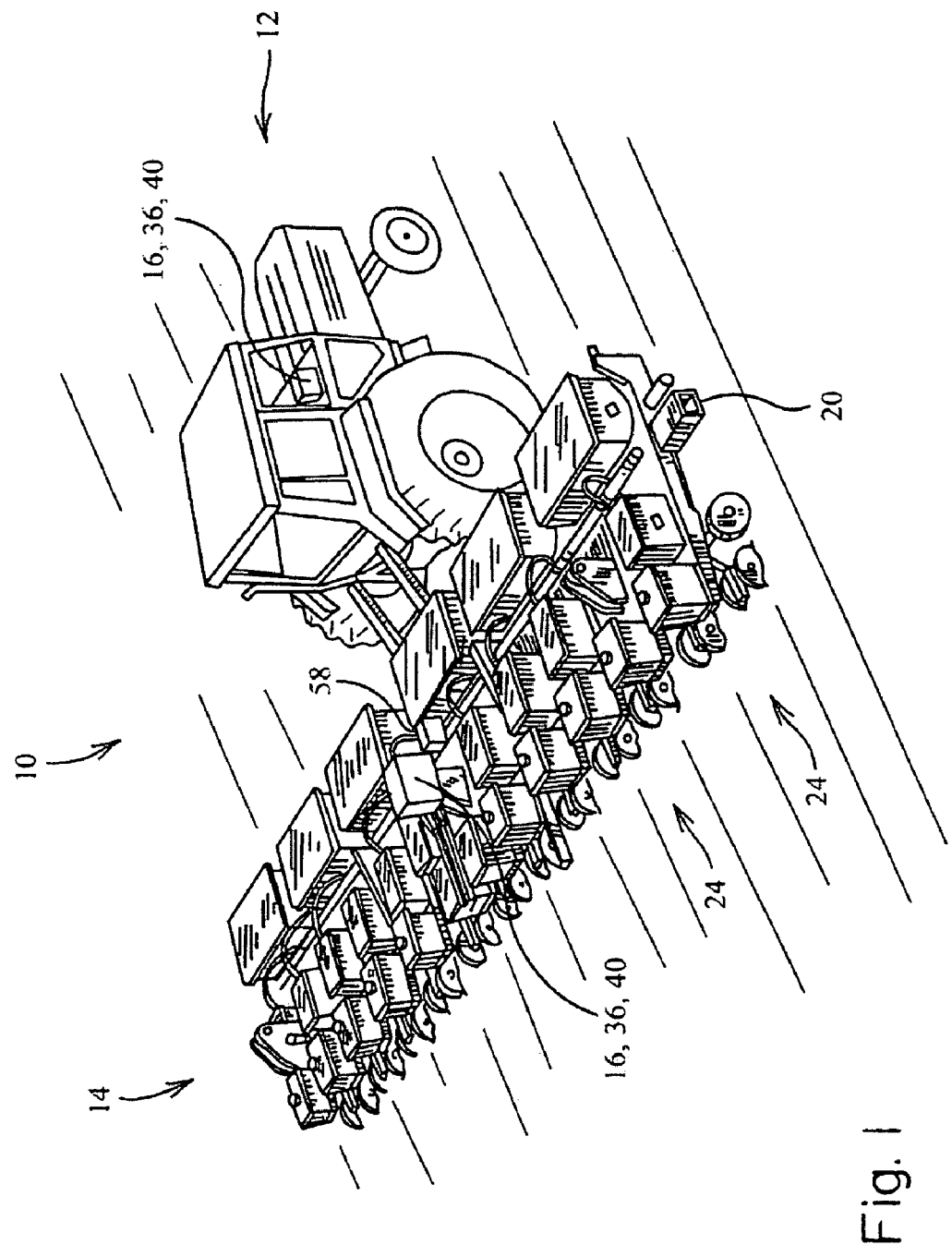
FIG. 1 is a perspective view of an agricultural seeding machine incorporating an embodiment of a monitoring and control unit of the present invention.
Figure 2:
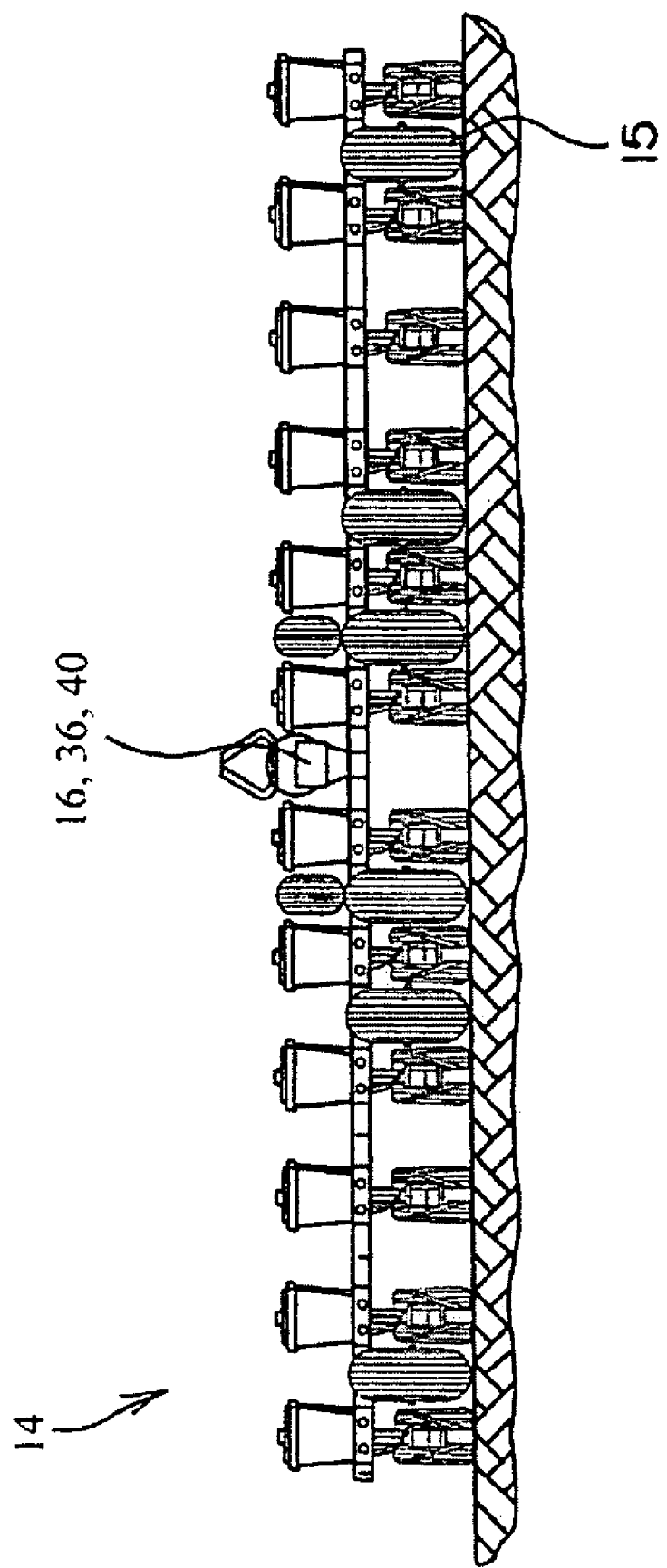
FIG. 2 is an end view of the seeding machine having the monitoring and control unit as shown in FIG. 1.

Referring now to the drawings, and more particularly to FIG. 1, there is shown an agricultural system 10 including a tractor 12 and seeding machine 14. Seeding machine 14 is in the form of a row crop planter 14, but could be a grain drill. Tractor 12 provides the motive power for planter 14 and the mechanisms therein. A seed spacing monitoring/control system 16 is incorporated and used by the operator of tractor 12 to monitor the placing of seeds, from planter 14.

Now, additionally referring to FIGS. 2-5, there is shown details of planter 14 that includes tool bar 20, seed supply 22, row units 24 each including a metering device 26 having a seed disk 28 with holes 30 therein. Metering devices 26 are either directly or indirectly connected to tool bar 20 that is in turn coupled with tractor 12. Seed is supplied to metering devices 26 by way of seed supply 22 and the seed is pooled over a portion of seed disk 28. Seed disk 28 is fluidly coupled to an airflow generator that supplies airflow to a cavity 46 and/or a cavity 48. The airflow generator may produce a positive or negative pressure depending on the configuration of planter 14. For ease of explanation the airflow will be understood to be a vacuum system. Airflow caused by the vacuum system is supplied to cavities 46 and/or 48 and thereby to one side of seed disk 28 causing air to flow through holes 30. The air flowing through holes 30 attracts seeds thereto as seed disk 28 is rotated through the pooled seeds in metering device 26. Seeds are connected with holes 30 and rotate from the pooled seeds to a point of discharge, as illustrated as a dashed line in FIG. 5, from metering device 26 so that it may travel, by way of a seed placement system 50, to the prepared furrow in the soil. As described, the seed disk 28 is the metering member. Other meters having different types of metering members can also be used with the present invention such seed plates, metering belts or finger plates.

Row unit 24 additionally carries a double disc furrow opener 52 (FIG. 3) for forming the seed furrow in the soil. An optional coulter wheel 54, particularly for use in no-till situations, may be placed ahead of double disc furrow opener 52. A pair of gauge wheels 56 are respectively associated with the pair of discs of double disc furrow opener 52. More particularly, each gauge wheel 56 is positioned generally in line with and immediately adjacent to the outside of each respective disc of double disc furrow opener 52. Each gauge wheel 56 may be vertically adjusted to adjust the depth of the furrow which is cut into the soil using double disc furrow opener 52.

A pair of closing wheels 58 is also part of row unit 24. Closing wheels 58 are positioned generally in line with double disc furrow opener 52. Closing wheels 58 are preferably biased in a downward direction and have a peripheral edge with a shape which may vary, depending upon the application. Seed placement system 50 is shown in the form of a gravity drop seed tube 42 (FIG. 3), but could be configured differently, such as a power drop seed placement system with a powered wheel, etc.

Seed metering system 26 receives seed from a main seed supply, such as seed from a distant main seed hopper which is supplied via air or the like, or a seed hopper carried by tool bar 20 or a frame of row unit 24. Within the housing of metering system 26 there is a seed pool area. Seed disk 28 has a plurality of holes 30 having seed cells on the seed side of disk 28 intermittently spaced about the periphery thereof. The vacuum airflow promotes entry of the seeds into the seed cells and maintains the seeds in place within the seed cells. Seeds are transported from the seed cells to seed placement system 50. Of course, seed meter 26 may be configured with a positive pressure to assist in seed movement rather than a vacuum pressure.

Figure 6:
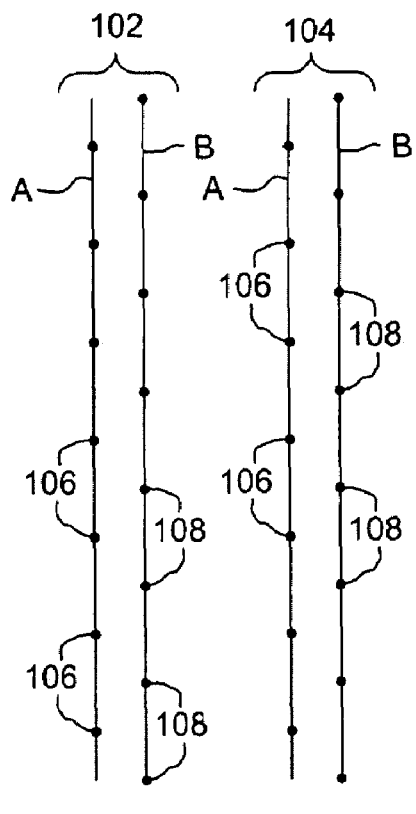
FIG. 6 is plan view showing an example of seed spacing in twin-row.

Row crops require accurate population levels or seeding rates to achieve maximum yields. Some crops, such as corn and cotton, yield best with even, precise plant spacing or plant-to-plant distances within a given row. In a twin-row application, it is not only desired to precisely space plants within one row, but also to precisely space the plants in both rows of the twin-rows such that seeds in one row are evenly spaced relative to seeds in the adjacent twin row. For example, if the desired seed population results in 12 inch (30.5 cm) spacing within the rows, when a seed is planted in one row, it is desired to plant a seed in the adjacent twin row 6 inches (15.25 cm) later. An example of synchronized seed spacing between rows is shown in the twin row application shown in FIG. 6. There, twin rows 102 and 104 are shown each having plant rows A and B with seeds 106 and 108 respectively in each row. To maximize the yield, the seeds 108 in row B alternate with the seeds 106 in row A. The present invention evaluates the spacing of the seeds between rows by utilizing sensor input from detecting a parameter related to seed placement and provides means to adjust the seed spacing during planting operation to achieve consistent control of the plant-to-plant spacing of the seeds among multiple rows thereby optimizing yield over a field having the same seeding population but not having precise plant spacing.

The row units 24 include a meter drive mechanism 64 for each metering device 26. The drive mechanism includes a transverse hex shaft 66 driven by a planter ground wheel 15. A flexible cable 68 drive is driven by the shaft 66 and in turn provides an input to a transmission 70. The transmission 70 is coupled to the driveshaft 72 of the metering device 26. The transmission 70 includes a planetary gear system such as that shown in U.S. Pat. No. 7,273,016 and incorporated herein by reference. The ring gear of the planetary system is driven by an electric motor 74 controlled by a controller 76. A master controller 78 generates a reference signal that is communicated to the motor controller 76. In addition, a seed sensor 80 located in the seed tube 42 generates a signal when a seed passes which is also communicated to the motor controller 76. The seed sensor 80 is one of many different sensors that can be used in the present invention as described below.

Figure 7:
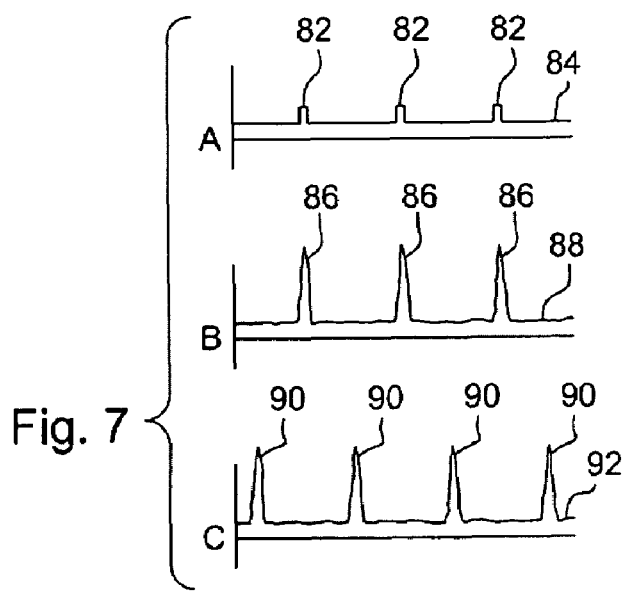
FIG. 7 is a graph showing exemplary signals used in control of seed placement.

With reference to FIG. 7, the top line A is the reference signal 84 generated by the master controller 78 which contains of a series of pulses 82 spaced a predetermined time interval apart based on planting speed and desired seed spacing. The center line B is the output index signal 88 of the seed sensor 80 of a row unit. The signal 88 has spikes 86 generated each time a seed passes the sensor. This index signal, in this example based on the passing seed, represents a parameter related to the placement of seed in the furrow beneath the row unit. A processing circuit of the motor controller 76 compares the reference signal 84 with the index signal 88 generated by the seed sensor 80 and determines in the relationship there between. As shown, the seeds pass the sensor approximately at the same time as the pulses 82 of the reference signal are generated. The bottom signal line C is the index signal 92 from an adjacent row unit of the planter having spikes 90 generated from seeds passing the sensor 80 of that row unit. The index signal 92 is also compared to the reference signal 84 by the motor controller 76 of that row unit. As shown in FIG. 7, the seeds from second row unit are passing the sensor in approximately the middle of the time interval between the pulses 82 of the reference signal 84. As a result, the seeds in second row are evenly staggered relative to the seeds in first row. For a twin row seeding application, this is a desired relationship between the index signals of the two rows and the reference signal. If however, both spikes 86 and 90 occurred with the pulses 82 of the reference signal, the seeds in the two rows would be placed adjacent to one another, not staggered. In that case, the motor controller of one or both row units would activate the motor 74 to alter the metering action of the seed meter by momentarily changing the speed of the drive shaft 72, thereby changing the timing of the seeds passing the associated sensor 80. This example relationship between the signals assumes that the two row units are both located at the same fore and aft position relative to the tool bar 20. The desired signal relationship will need to consider the relative fore and aft locations of the row units.

Figure 3:
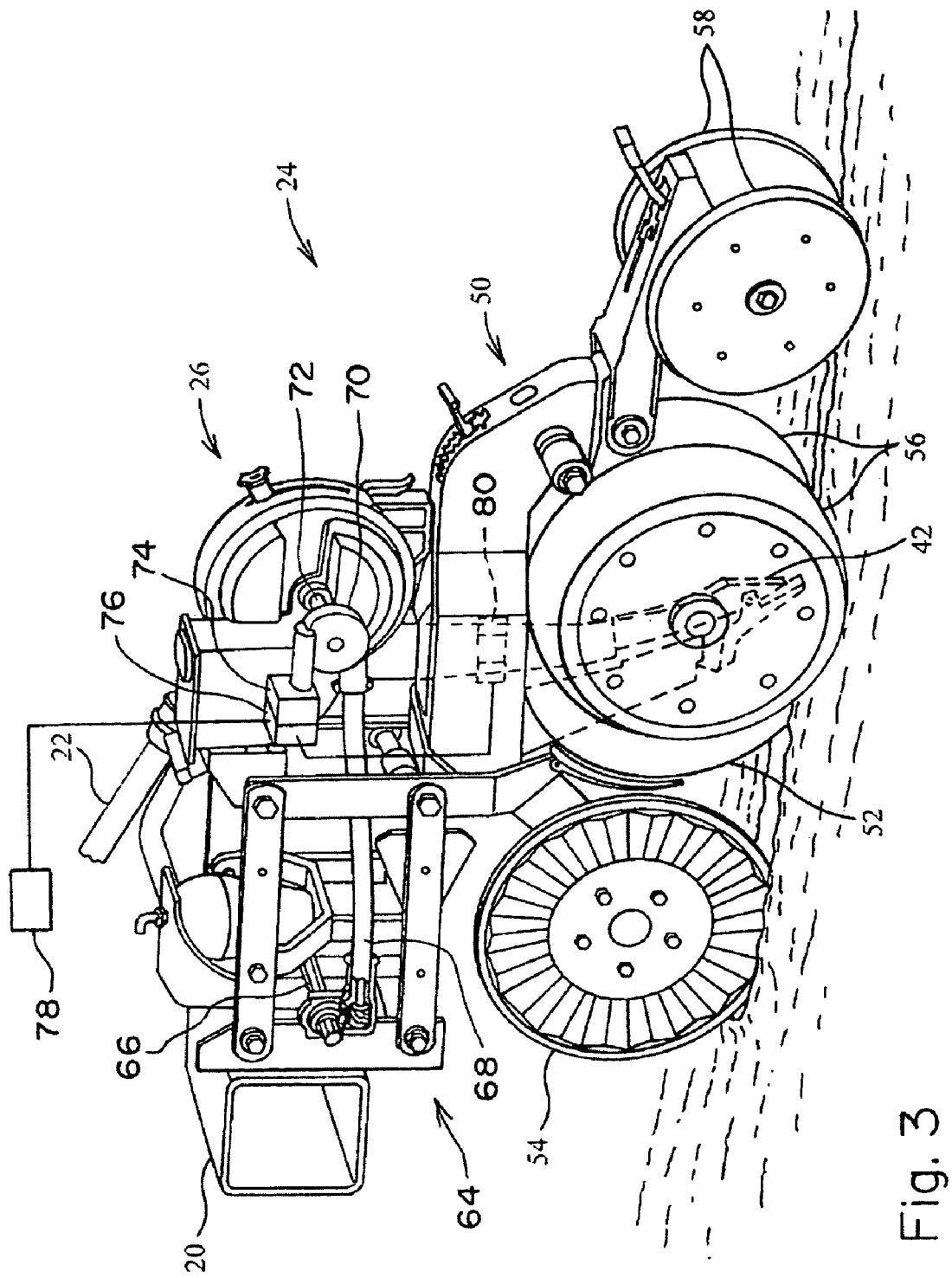
FIG. 3 is a perspective view of a row unit having a metering and placement system that can be used in an embodiment of the seeding machine of FIGS. 1 and 2.
Figure 4:
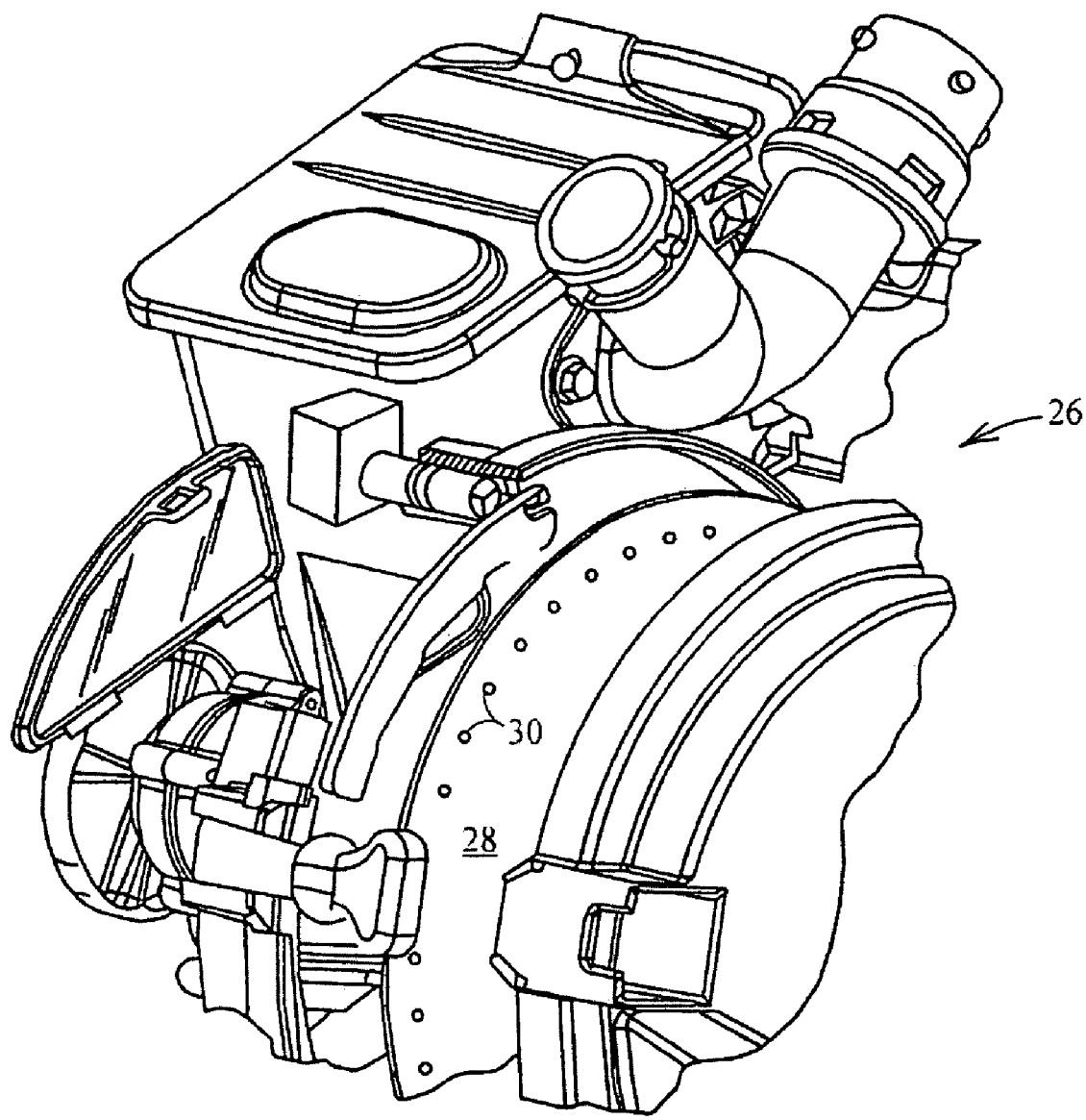
FIG. 4 is a perspective partially exploded view of the metering system shown in FIG. 3.
Figure 5:
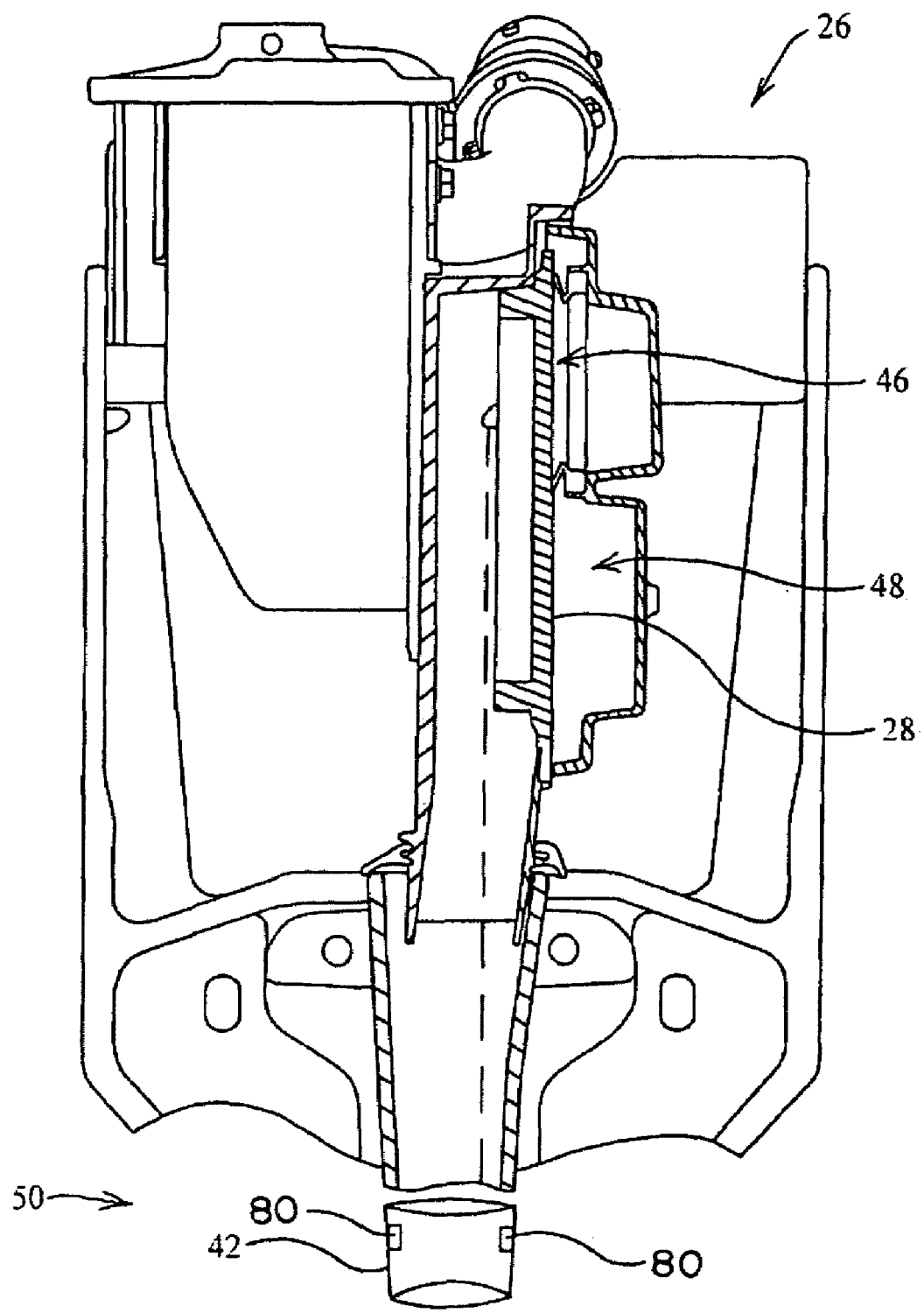
FIG. 5 is a partially sectioned view of the metering system of FIGS. 3 and 4.

The reference signal 82 is communicated to each row unit of the seeding machine and each motor controller is selectively programmed to generate a desired relationship between the reference signal and index signal for that row. This results in producing a desired relationship between the seeds in two or more rows of the seeding machine 14. It will be readily apparent that any type of drive mechanism may be used to drive the metering device that is capable of electronic control to alter the metering action by changing the speed of the metering member. The electro-mechanical drive 64 shown in FIG. 3 is one example. A pure electric drive with motors for each meter is another possibility as are electrically controlled hydraulic motors. Another option is an electronically controlled clutch mechanism in the meter drive. Any transmission having two or more operating speeds can also be used to change the meter drive speed.

The reference signal 82 is shown as a square wave analog signal. A sine wave or any other periodically varying signal. Alternatively, a periodic digital signal can be used as well. While an electronic signal is preferred, the reference signal may be transmitted by sound or light.

Figure 8:
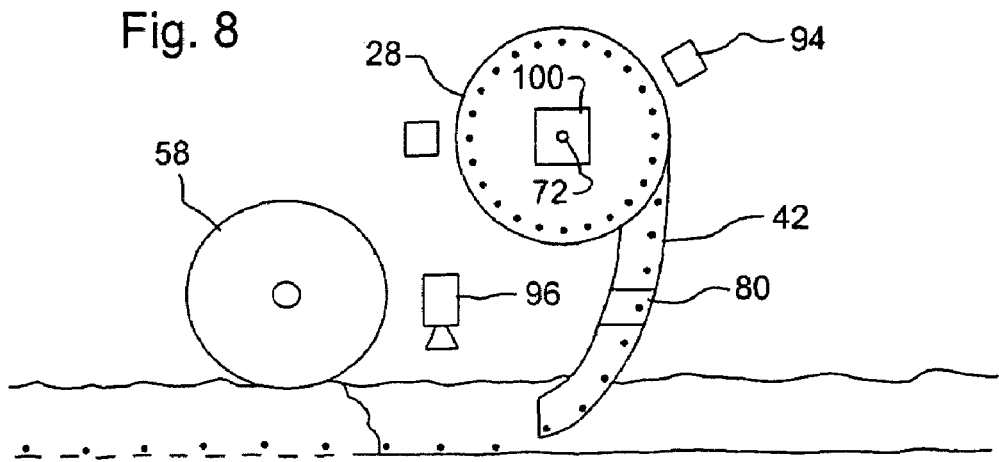
FIG. 8 is a schematic side view of the row unit showing alternative sensor locations.

Various types and locations of sensors can be used as well as long as the sensor detects a parameter related to seed placement. With reference to FIG. 8 other sensors and locations are shown schematically, including the seed sensor 80 on the seed tube 42. A seed sensor 94 can be located adjacent the seed disk 28 to detect seed passing there. Likewise, a seed sensor 96 can be located to detect seed in the furrow. Sensor 98 can detect a feature in the disk 28 or sensor 100 can detect a feature of the drive that indicates their rotational positions which then relates to seed placement. Sensing a feature of the metering member or meter drive requires a known relationship between the detected feature and the location of the holes 30 of the metering member.

The motor controllers 76 can be physically located on the row unit as shown in FIG. 3 or can be part of the monitoring/control system 16 mounted on the planter frame or it could be located on the tractor. Individual controllers or processing circuits can be used to control each drive motor or a single controller or processing circuit can be used sequentially with each row unit. The master controller 78 generating the reference signal 82 is preferably part of the monitoring/control system 16. The motor controller or controllers and the processing circuit or circuits constitute a control means for receiving signals, determining the relationship between signals and controlling the meter drives to alter the metering action. The reference signal generation, when independent of the operation of any row unit may also be included in the control means or may be a separate component. The invention should not be limited to any particular device or devices to accomplish the determine the signal relationship or altering of the metering action.

An alternative system is shown schematically in FIG. 9. A first row unit has a meter drive motor 174, a motor controller 176 and a sensor 180. A second row unit likewise has meter drive motor 274, motor controller 276 and sensor 280. Additional row units three and beyond, are similarly constructed. The index signal from the sensor 180 of the first row unit is communicated to a controller 276 of a second row units controlling the motor 274. The associated sensor 280 provides an index signal for second row unit to the controller 276. The index signal from sensor 180 is also communicated to additional row units. In this embodiment, the reference signal, instead of being generated by a master controller, is generated by the sensor of the first row unit. The motor controllers of the other row units are programmed to provide a desired relationship between the index signals of their respective row units and the reference signal produced by the first row unit.

A third arrangement is shown in FIG. 10 with two sets of twin rows shown, twin row 200 having row units 201 and 202 and twin rows 300 having row units 301 and 302. Row units 201 and 301 each have a drive motor 174, motor controller 176, and associated sensor 180. Row units 202 and 302 each have a drive motor 274, motor controller 276, and associated sensor 280. The index signal from each sensor 180 is communicated to controller 276 associated twin row as the reference signal. Controllers 276 are selectively programmed to produce the desired relationship between the reference signal from sensors 180 and the index signal from sensors 280 to produce the desired relationship between the seeds in the twin rows 201 and 202 and the twin rows 301 and 302.

A display 36 and controls 40 of monitoring system 16 may be located in an operating position to provide information to the operator. In one form of the invention, the processing circuit is programmed to make the necessary alterations to the metering action to achieve the desired relationship in seed placement. In another implementation of the invention, the relationship between the reference signal and the index signal for a given row unit is displayed to the operator. A manual input device, such as a knob, dial, touch screen feature, etc. on the display can be used by the operator to momentarily adjust the speed of the metering device, thereby changing the relationship between the signals.

The processing circuit additionally receives a speed signal that relates to a speed of tractor 12 and/or planter 14 upon the ground from a speed sensor 58. Speed sensor 58 may be on tractor 12 or planter 14 and the signal is representative of the speed of planter 14 across the ground. The speed signal may be conveyed to the processing circuit by way of a communication of the signal from tractor 12, or the speed can be determined by the placement of speed sensor 58 on planter 14 with speed sensor 58 being associated with a ground contacting wheel, a global positioning system, a sonar system directed at the ground or a radar system directed at the ground, or the like. The speed signal can be used by the control system 16 to establish the meter drive speeds. In addition, the ground speed is used by the master controller 78 to determine the frequency of the pulses 84 in the reference signal 82.

Seed sensor 80 when in the seed tube 42 may be in the form of an optical sensor with a light source located on one side of seed tube and a light sensor on an opposite side of seed tube 42. Other types of seed sensors can be used on the seed tube or on the metering device or seed furrow as desired. Various non-contact sensors can be used to detect a feature of the metering member or drive such as optical sensors or electromagnetic sensors, etc.

Alternatively, a clutch in the seed meter drive mechanism, such as shown in U.S. patent application Ser. No. 12/062,158, filed Apr. 3, 2008, and incorporated herein by reference, can be disengaged, or slipped, to alter the metering action thereby changing the seed placement relationship between rows.

Having described the preferred embodiment, it will become apparent that various modifications can be made without departing from the scope of the invention as defined in the accompanying claims.

The invention claimed is:

1. A seeding machine comprising:
   means for generating a reference signal;
   multiple row units, at least one row unit having:
   a seed metering device providing a metering action to a plurality of seeds;
   a drive for the seed metering device;
   a sensor adapted to sense a seed meter parameter related to seed location in a furrow beneath the row unit and generating an index signal; and
   control means for receiving the index signal from the row unit sensor and for receiving the reference signal, the control means determining a relationship between the index signal and the reference signal and the control means being operably coupled to the drive for altering the metering action of the seed metering device to establish a desired relationship between the index signal and the reference signal.

2. The seeding machine as defined by claim 1 further comprising means for displaying to an operator the current relationship between the index signal and the reference signal and manual means for inputting to the control means a change to the metering action of the seed metering device of the at least one row unit to establish a desired relationship between the index signal and the reference signal.

3. The seeding machine as defined in claim 1 wherein the sensor is a seed sensor operable to sense the passing of seed.

4. The seeding machine as defined in claim 3 where the seed sensor is located to sense seed passing on the seed metering device.

5. The seeding machine as defined in claim 3 further comprising a seed placement device receiving the seed from the seed metering device and delivering seed to a furrow formed in soil beneath the row unit and wherein the seed sensor is located to sense seed passing through the seed placement device.

6. The seeding machine as defined in claim 3 where the seed sensor is located to sense seed passing in the furrow beneath the row unit.

7. The seeding machine as defined in claim 3 wherein the relationship between the index signal and the reference signal is based on the time between the reference signal and the index signal.

8. The seeding machine as defined in claim 1 wherein the sensor senses a feature of one of the seed metering device and the drive for the seed metering device.

9. The seeding machine as defined in claim 1 wherein the drive is a variable speed drive variable independently of the drive of other row units.

10. The seeding machine as defined in claim 1 wherein the drive includes a clutch mechanism.

11. The seeding machine as defined in claim 1 wherein the reference signal is generated independently of the operation of any row unit.

12. The seeding machine as defined in claim 1 wherein the index signal of a first row unit is received by the control means as the reference signal for one or more other row units.

13. The seeding machine as defined in claim 1 wherein the multiple row units are arranged in pairs with the sensor of a first row unit of the pair generating the reference signal received by the control means for the second row unit of the pair.

14. The seeding machine as defined in claim 13 wherein the sensor senses the passage of seed and produces a signal in response thereto.

15. The seeding machine as defined in claim 13 wherein the sensor senses a feature of one of the seed metering device and the drive and produces a signal in response thereto.

16. A method of coordinating the placement of seed planted by multiple row units of a planter each having a seed meter, the method comprising the steps of:
   generating a reference signal;
   operating the multiple row units;
   sensing a parameter related to seed placement for one or more row units and generating an index signal for each of the one or more row units in response thereto;
   determining a relationship between the reference signal and the index signal for each of the one or more row units; and
   altering the metering action of the seed meter of one or more of the row units to establish a desired relationship between the index signal for each of the one or more row units and the reference signal.

17. The method as defined by claim 16 further comprising the step of displaying to an operator the relationship between the reference signal and the index signal of one of the row units.

18. The method as defined by claim 16 wherein the sensing step senses the passing of seed.

19. The method as defined by claim 18 wherein the sensing step senses seed in the seed meter of the row unit.

20. The method as defined by claim 18 wherein the sensing step senses seed in a seed furrow in the soil.

21. The method as defined by claim 18 wherein the sensing step senses seed between the seed meter and a seed furrow in the soil.

22. The method as defined by claim 16 wherein the sensing step senses a feature of one of a seed meter and a seed meter drive.

23. The method as defined by claim 16 wherein the step of altering the metering action of the seed meter of one or more row units changes the speed of a seed meter drive.

24. The method as defined by claim 16 wherein the reference signal is generated independently of the operation of any row unit.

25. The method as defined by claim 16 wherein the reference signal is the index signal of one row unit.

26. The method as defined by claim 16 wherein:
   the row units are arranged in pairs with the reference signal being the index signal of a first row unit of the pair;
   the step of determining a relationship between the reference signal and each index signal determines the relationship between the reference signal and the index signal of the second row unit of the pair; and
   the altering step alters the metering action of one or both of the pair of row units.

* * * * *